US007341088B2

(12) United States Patent
Schötz et al.

(10) Patent No.: US 7,341,088 B2
(45) Date of Patent: Mar. 11, 2008

(54) MECHANISM FOR LAMINATING PROFILES

(75) Inventors: Manfred Schötz, Schwarzach (DE); Robert Hainz, Hunderdorf (DE)

(73) Assignee: Inootic/Deceuninck GmbH, Bogen (DE)

( * ) Notice: Subject to any disclaimer, the term of this patent is extended or adjusted under 35 U.S.C. 154(b) by 401 days.

(21) Appl. No.: 11/051,741

(22) Filed: Feb. 4, 2005

(65) Prior Publication Data

US 2005/0150603 A1 Jul. 14, 2005

Related U.S. Application Data

(63) Continuation-in-part of application No. 10/847,079, filed on May 17, 2004, now abandoned.

(30) Foreign Application Priority Data

May 22, 2003 (DE) ................................ 103 23 213

(51) Int. Cl.
*B29C 65/54* (2006.01)

(52) U.S. Cl. ...................... 156/539; 156/500; 156/543; 156/546; 156/547; 156/555; 156/556; 156/578; 156/244.11; 156/324

(58) Field of Classification Search ................ 156/107; 52/786.13
See application file for complete search history.

(56) References Cited

U.S. PATENT DOCUMENTS

| | | | |
|---|---|---|---|
| 1,555,816 A * | 10/1925 | Ambler et al. | 156/164 |
| 3,424,836 A * | 1/1969 | McKelvey et al. | 264/251 |
| 3,759,771 A * | 9/1973 | Battersby | 156/109 |
| 4,211,181 A * | 7/1980 | Mueller et al. | 118/411 |
| 4,472,235 A * | 9/1984 | Pasche et al. | 156/461 |
| 4,826,547 A * | 5/1989 | Lenhardt | 156/109 |
| 6,606,837 B2 * | 8/2003 | Trpkovski et al. | 52/745.19 |
| 6,630,028 B2 * | 10/2003 | Briese et al. | 118/683 |
| 2003/0059532 A1 * | 3/2003 | Vianello | 427/230 |
| 2003/0205315 A1 * | 11/2003 | McGlinchy et al. | 156/247 |

FOREIGN PATENT DOCUMENTS

DE 3233490 A1 * 11/1983

* cited by examiner

*Primary Examiner*—Jessica Ward
(74) *Attorney, Agent, or Firm*—Day Pitney LLP

(57) ABSTRACT

The invention concerns a mechanism for laminating profiles, such as plastic window profiles, for example, in which several profile sides, as of L-shaped or Z-shaped profiles, for example, can be laminated at the same time, by means of a single work pass, in that an adjustable slide, which establishes a glue-free zone between the laminating foils, is provided in the device for applying the bonding agent.

5 Claims, 4 Drawing Sheets

2a
V
4
4a
1
3a
8
8
3
2
7
R
Z1
Z2
5
Z3
6
P

MECHANISM FOR LAMINATING PROFILES

CROSS-REFERENCE TO RELATED APPLICATION

This application is a continuation-in-part (CIP) of U.S. patent application Ser. No. 10/847,079, filed May 17, 2004, now abandoned.

BACKGROUND OF THE INVENTION

The invention concerns a mechanism for laminating profiles, with a fitting system for the foil lamination, with two adjustable slides for setting the bonding agent application width, a device for feeding and removing the profile, and at least one device for supplying and applying the bonding agent.

Such mechanisms are used primarily in profile production and window construction. By means of such mechanisms, laminating foils are applied to one or more profile sides. To this end, special bonding agents are supplied to the profile surface and then, after the laminating foil is applied, the laminating foil is pressed firmly against the profile surface by means of a number of press rolls which exert a predefined pressure. After one side of the profile has been laminated in this manner, the profile is again passed through the mechanism and then the bonding agent and laminating foil are applied to the second side of the profile to be laminated.

There are various disadvantages associated with the said method of laminating one or more sides of profiles. Thus, this method necessitates extensive fitting and refitting times, as a large number of press rolls need to be set. The press rolls (80 to 100 for each profile) must always be manually adjusted and calibrated in the horizontal, vertical and axial directions, to match the individual profile contours. When two sides of a profile need to be laminated, the fitting process must be repeated, because each one of the profile sides to be laminated must be individually produced and fitted. This necessitates considerable work and time, making the product that much more expensive.

SUMMARY OF THE PRESENT INVENTION

Thus, the object of the invention is to propose a mechanism for laminating several profile sides, which requires less fitting time and is flexible, meaning that it can be adjusted to suit different profile shapes and laminating foils without necessitating extensive work.

By means of the invention described in the claims, these disadvantages can be avoided. First of all, the invention saves a work step when two profile sides need to be laminated because only one work pass is needed instead of two. This is made possible by the use of an additional, so-called slide, which creates a bonding agent-free zone in the application slit of the mechanism and makes it possible to apply two separate laminating foils at the same time to two different sides of the profile, such as an L-shaped or Z-shaped profile, for example, on the inside or the outside, without additional fitting work. Secondly, the refitting work is facilitated by the fact that the profile is fed vertically into the mechanism, instead of horizontally as in the case of conventional mechanisms, allowing for the secure pressing of the laminating foil to the profile surface. The fitting set with its press rolls can even remain in place. Any necessary refitting can be done in a matter of minutes.

BRIEF DESCRIPTION OF THE DRAWING

In the following, the invention is explained in more detail with the aid of an execution example described in the figures.

The FIG. 1 depicts a schematic arrangement.

Figure 2:
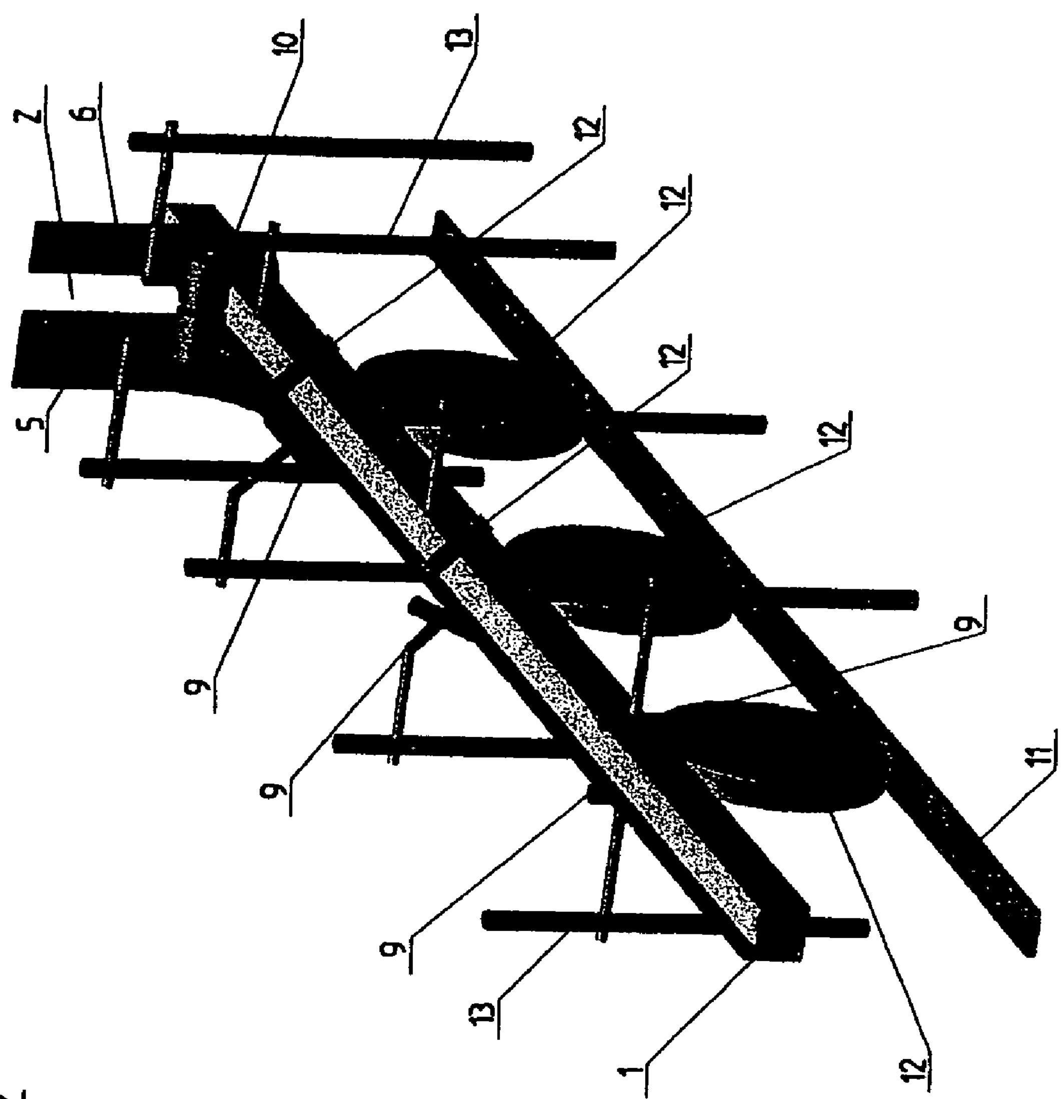

The FIG. 2 depicts a prospective view of an arrangement.

Figure 3:
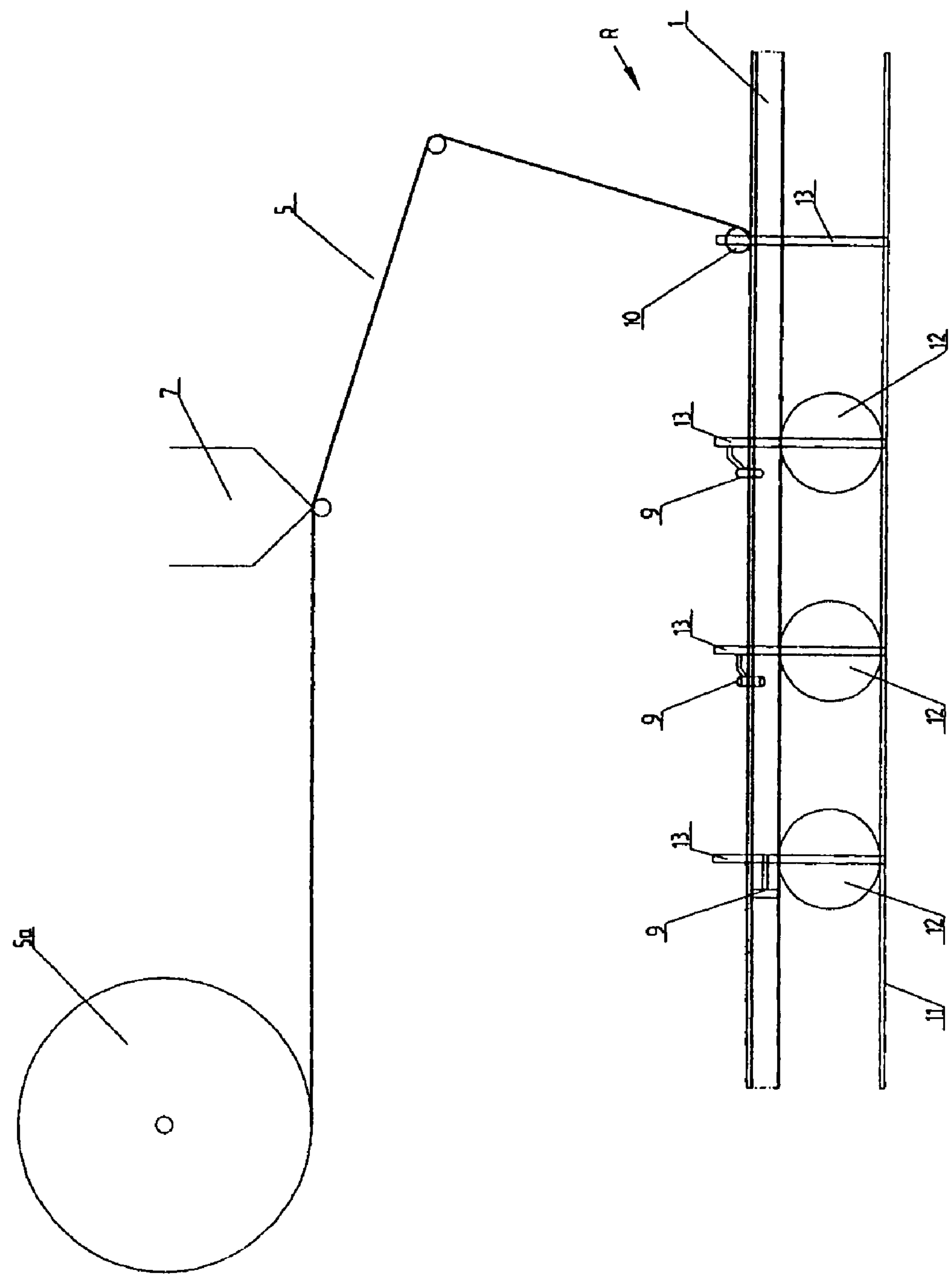

The FIG. 3 depicts a side view of an arrangement.

Figure 4:
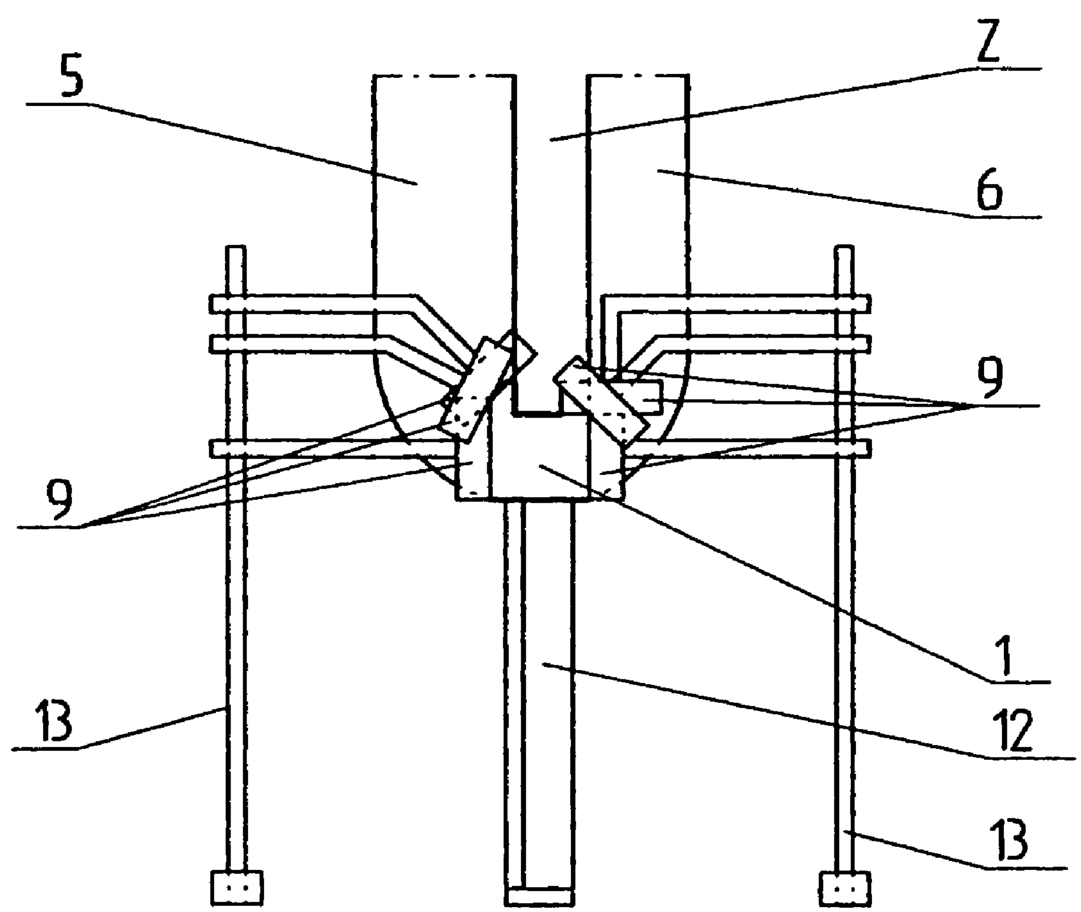

The FIG. 4 depicts a cross sectional view of an arrangement.

DETAILED DESCRIPTION OF THE PREFERRED EMBODIMENT

Figure 1:
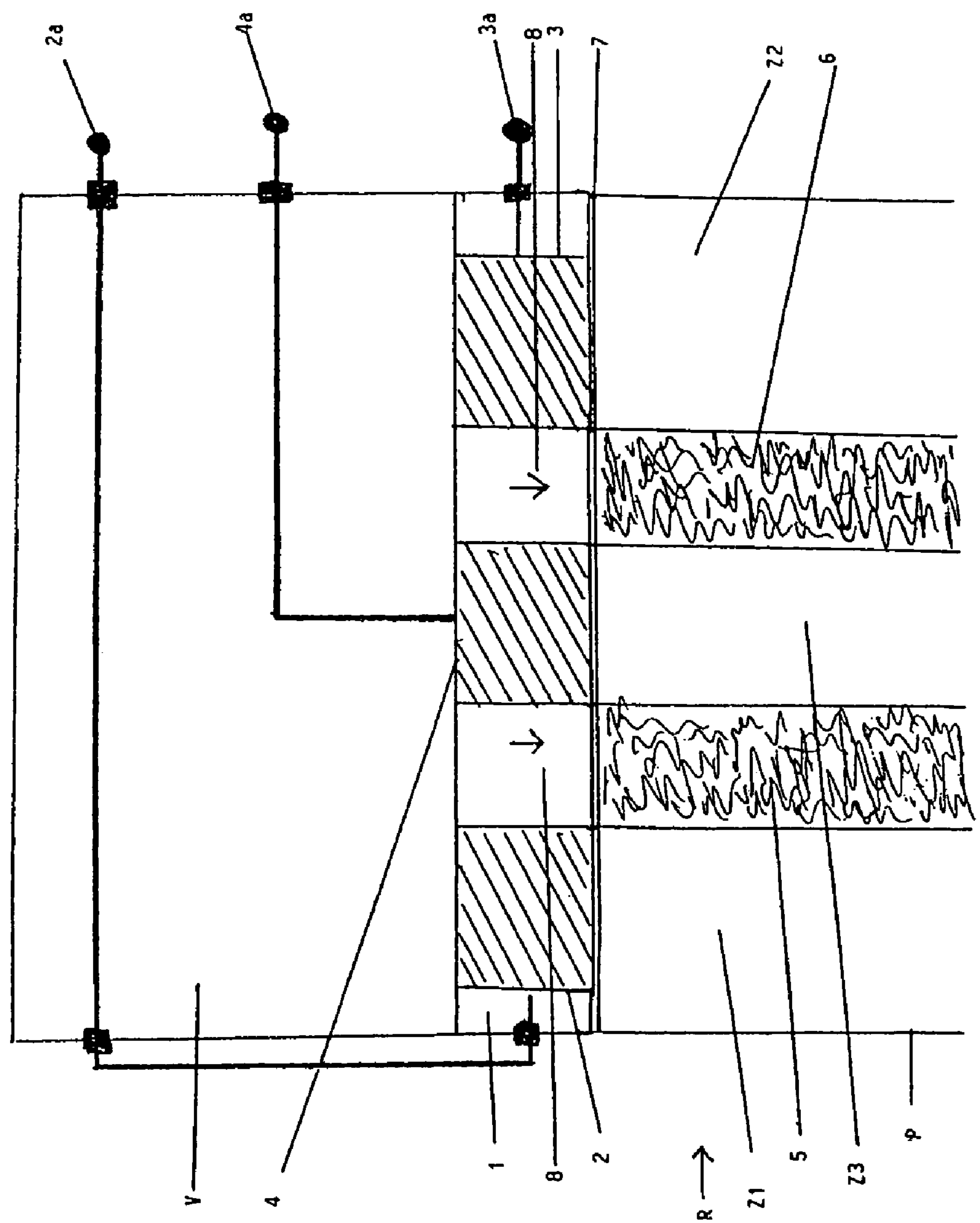

The FIG. 1 depicts a mechanism V, through which the profile P is vertically passed and taken up by the fitting set R in the known manner. Several slides, or three slides in the execution example presented here, are positioned in the feeding device 1, above the application slit 7 for the bonding agent 8, in the mechanism V. Of these three slides, the two adjustable slides 2 and 3 delimit the foils 5 and 6 on the left and right sides, respectively. A further adjustable slide 4 is positioned between the two foils 5 and 6 and, like the two other slides 2 and 3, it does not allow the bonding agent 8 to pass through to the profile P or the laminating foils 5 and 6, leaving a bonding agent-free zone Z3 on the profile P, just like the two other slides 2 and 3.

The two slides 2 and 3 can be adjusted by means of the actuators 2*a* and 3*a*, while the center slide 4 is activated by means of the actuator 4*a*. As a result, two different foils 5 and 6 can be applied to both sides of the profile P at the same time, in a single layer on the inside and a single layer on the outside, without additional fitting work. Currently, the bonding agent 8 can be applied to the foils 5, 6 or the profile P in widths of about 0 to 150 mm each. The direction of flow of the bonding agent 8 is indicated with the symbol ↓.

Because the profile P is passed through the mechanism V in the vertical direction, profile shapes such as L-shaped or Z-shaped profiles, for example, can be laminated on one or both sides at the same time.

The FIG. 2 depicts a prospective view of mechanism V shown in FIG. 1. The pressure rollers 9 seen exert a predefined pressure and the laminating foil is pressed firmly against the profile surface. Also seen are laminating rollers 10, machine part 11, drive rollers 12, and tool bars 13.

The FIG. 3 depicts a side view of mechanism V. The Foil reel 5A seen holds the laminating foil.

The FIG. 4 depicts a cross section of mechanism V. The pressure rollers 9 seen exert a predefined pressure and the laminating foil is pressed firmly against the profile surface.

The invention claimed is:

1. Mechanism for laminating a profile (P) with a fitting system for a foil lamination, comprising at least two adjustable slides for setting a bonding agent application width, a device for feeding and removing the profile (P), and at least one device for supplying and applying the bonding agent, characterized in that an adjustable slide (4) is provided between two adjustable slides (2 and 3) on the feeding device (1) of the mechanism (V), for creating a bonding agent-free zone between two laminating foils (5, 6) on the profile (P) to be laminated.

2. Mechanism according to claim 1, characterized in that actuators (2*a*, 3*a*, 4*a*) are provided for each slide (2, 3, 4).

3. Mechanism according to claim 1, characterized in that the profile (P) is covered on two sides with the laminating foils (5,6) by means of pressure rollers (9) acting simultaneously on at least two sides of the profile (P) and of the laminating foils (5,6).

4. Mechanism according to claim 1, characterized in that the profile (P) is passed vertically through the mechanism.

5. Mechanism according to claims 1, characterized in that a complete, exchangeable fitting set (R) is provided for every profile type.

* * * * *

UNITED STATES PATENT AND TRADEMARK OFFICE

CERTIFICATE OF CORRECTION

PATENT NO. : 7,341,088 B2
APPLICATION NO. : 11/051741
DATED : March 11, 2008
INVENTOR(S) : Manfred Schötz and Robert Hainz It is certified that error appears in the above-identified patent and that said Letters Patent is hereby corrected as shown below:

On the Title page item "(73) Assignee: Inootic/Deceuninck GmbH" should read

--(73) Assignee: Inoutic / Deceuninck GmbH--

Signed and Sealed this

Twenty-sixth Day of August, 2008

JON W. DUDAS
*Director of the United States Patent and Trademark Office*